Patented July 12, 1932

1,867,421

UNITED STATES PATENT OFFICE

WILLIAM H. ROWAN AND HENRY K. BUCKNER, OF NASHVILLE, TENNESSEE

METHOD OF CURING CEMENT CONCRETE

No Drawing.   Application filed August 24, 1929.   Serial No. 388,260.

This invention relates to means for protecting cement concrete while it is curing by providing a sealing coat over the new concrete surface, which sealing coat excludes the air and retains the water in the new concrete a sufficient time to permit the concrete to cure.

The general object of this invention is to provide a method of this character which includes the use of a solution of paraffin as a foundation to be dissolved by proper means in some volatile solvent, such as gasoline, petroleum naphtha, or any other suitable solvent. This solution is applied to the surface of the newly poured concrete by spraying. Immediately upon its being applied, the solvent begins to evaporate, and after a relatively short period of time leaves a paraffin coat uniformly spread over the new concrete surface, which is air-tight and which retains water in the concrete a sufficient time to permit the concrete to cure, thus preventing cracking or other defects.

Preferably the solution will contain a certain proportion of rosin which, of course, is also dissolved by the solvent. The exact proportion of rosin will be determined by the conditions which obtain at the time the solution is to be applied.

On a vertical surface, such as that of a concrete column, wall or pier, a more viscous coating is desirable and will be obtained by increasing the proportion of rosin in the solution. On a level surface, such as that of a concrete pavement, a solution of paraffin only will be adequate if the weather is cool. The addition of rosin, however, is desirable if the weather is hot or if the surface of the concrete is exposed to the rays of the sun during the first stages of the curing. We do not wish to be limited to any definite proportion of rosin but rather wish to add the rosin in any proportion we may desire to obtain the solution which will be most suitable for the purpose intended. In a solution for general use, though we do not wish to be limited to this either, the rosin is used in the proportion of two parts to five parts of paraffin.

All the solutions referred to are thin enough to be sprayed onto the concrete. The solvent evaporates rapidly after the spraying operation so that a thin coating of paraffin, or of paraffin and rosin, is left upon the surface of the concrete.

Any solution, above referred to, can be shipped in tank cars or in drums or barrels. Only a small quantity is required to cover quite an area, about one-tenth gallon for each square yard of concrete surface, and obviously the solution may be kept on hand at all times and applied as needed by the use of a spray.

It will, of course, be obvious that this matter of providing a coating for new concrete is a very serious one in the building of highways. Various methods of curing newly laid concrete have been used. One method is that of surrounding the new concrete with embankments which confine quantities of water poured over the concrete. This method is known as ponding, and is impractical for long stretches of roadway and on grades, as well as very expensive. In another method, which is not satisfactory, as soon as the concrete can sustain considerable weight, the surface is covered with several inches of earth which has to be kept continuously wet and which later on has to be removed before the road can be opened to traffic. In a further method, which is not satisfactory either, a thickness of hay is spread upon the concrete surface, which must also be kept wet and which must be eventually cleared away.

With our method, the spraying can be very readily done as soon as the surface of the concrete is free from the superficial layer of water and before the body of concrete is capable of sustaining any considerable weight. It is recognized that water must be retained in the surface from the earliest moment possible, if surface checking and cracking are to be prevented. Only a thin coating of the solution of paraffin and rosin is necessary upon the surface of the concrete, this coating acting to retain the water within the concrete until the concrete has become cured.

It is not necessary that the coating be removed when the road is to be used. Preferably, the solution will contain a dye which affords a visible means by which the operator of the spraying machine is enabled to apply the soluton uniformly to the surface of the concrete and to detect any uncovered portions of the surface.

It will be understood that by the term "concrete" as used in the claims, we refer to any artificial stone which requires that the mixing water shall be kept from being evaporated.

It will be particularly noted that in curing or protecting it while it is being cured, we use a composition which does not include in its ingredients any bitumen or any compound containing bitumen or asphalt, but that the composition very largely consists of paraffin. The presence of Judian bitumen is a decided disadvantage for the reason that the black surface remaining on concrete which has been cured with any compound containing bitumen or asphalt is positively detrimental to the concrete. For the best results, concrete during its curing process should remain at a uniformly moderate temperature (say 70° F.) and be kept moist. Nothing more is required by the very best practice. Concrete naturally becomes warm during the curing process owing to heat developed as a result of the hydration of the cement. If to this naturally developed heat, more heat is added because the concrete surface is dark or black, the concrete will often become too warm; it may possibly reach a temperature of 120° F. if exposed to the direct rays of the sun because its black surface has the power to absorb heat. Black bodies are also excellent radiators. They have the power to dissipate heat and thus assume a lower temperature. In the case of concrete, this dissipation of heat is a serious matter. Concrete poured during the day, if it has a black surface, will radiate heat during the night to surrounding objects or space and become cooled before it has fully set or hardened. Contraction follows and the result is the cracking of the concrete. These phenomena which we mention, namely the absorption and the radiation of heat by black bodies or bodies having black surfaces, are natural facts. It seems that color alone is a very important matter in concrete cures, so important in fact, that the U. S. Government precludes the use of "black cures" on projects where Federal aid is to be allowed, it having been definitely proved that concrete roads with black cures absorb heat during the day and radiate heat during the night and because of the changes in temperature which results in contraction and expansion, these roads were nearly ruined. Our method of curing does not affect the color of the concrete and so is not detrimental.

Having described our invention, we claim:—

1. A method of protecting freshly poured concrete paving while it is curing which consists in applying to the damp surface of the pavement a relatively thin coating of paraffin dissolved in a volatile solvent.

2. A method of protecting freshly poured concrete paving while it is curing which consists in applying to the damp surface of the pavement a relatively thin coating of paraffin and rosin dissolved in a volatile solvent.

3. A method of protecting freshly poured concrete paving while it is curing which consists in spraying upon the damp surface of the pavement a solution of paraffin in a volatile solvent.

4. A method of protecting freshly poured concrete paving while it is curing which consists in spraying upon the damp surface of the pavement a solution of paraffin and rosin in a volatile solvent.

In testimony whereof we affix our signatures.

WILLIAM H. ROWAN.
HENRY K. BUCKNER.